United States Patent
Kuwamura

(10) Patent No.: US 11,627,085 B2
(45) Date of Patent: Apr. 11, 2023

(54) NON-TRANSITORY COMPUTER-READABLE RECORDING MEDIUM, SERVICE MANAGEMENT DEVICE, AND SERVICE MANAGEMENT METHOD

(71) Applicant: FUJITSU LIMITED, Kawasaki (JP)

(72) Inventor: Shinya Kuwamura, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 17/522,961

(22) Filed: Nov. 10, 2021

(65) Prior Publication Data

US 2022/0303219 A1    Sep. 22, 2022

(30) Foreign Application Priority Data

Mar. 22, 2021    (JP) .............................. JP2021-046825

(51) Int. Cl.
| | |
|---|---|
| *H04L 47/125* | (2022.01) |
| *H04L 47/122* | (2022.01) |
| *H04L 43/16* | (2022.01) |
| *H04L 67/1027* | (2022.01) |
| *H04L 67/1008* | (2022.01) |

(52) U.S. Cl.
CPC ............ *H04L 47/125* (2013.01); *H04L 43/16* (2013.01); *H04L 47/122* (2013.01); *H04L 67/1008* (2013.01); *H04L 67/1027* (2013.01)

(58) Field of Classification Search
CPC ..... H04L 47/125; H04L 43/16; H04L 47/122; H04L 67/1008; H04L 67/1027; H04L 41/0895; H04L 41/0896; H04L 43/0852; H04L 41/5041; H04L 43/0876; G06F 2009/4557; G06F 9/45533
See application file for complete search history.

(56) References Cited

U.S. PATENT DOCUMENTS

| | | | | |
|---|---|---|---|---|
| 2015/0074679 | A1* | 3/2015 | Fenoglio | ............. H04L 67/1008 718/104 |
| 2017/0346886 | A1* | 11/2017 | Hikichi | ............... H04L 67/1017 |
| 2019/0272331 | A1* | 9/2019 | Gangadhar | ......... H04L 41/0897 |

FOREIGN PATENT DOCUMENTS

| | | |
|---|---|---|
| JP | 2005-316795 A | 11/2005 |
| JP | 2012-108682 A | 6/2012 |
| WO | WO-2021253239 A1 * | 12/2021 |

* cited by examiner

*Primary Examiner* — Kevin T Bates
*Assistant Examiner* — Ranjan Pant
(74) *Attorney, Agent, or Firm* — Fujitsu Patent Center

(57) ABSTRACT

Provided is a non-transitory computer-readable recording medium storing a service management program that causes a computer to execute a process, the process including acquiring a first input load indicating an amount of inputs received by a service at a first point in time, the service being implemented by containers, identifying first numbers of the containers corresponding to the first input load by referring to a storage unit that stores information where a second input load is associated with second numbers of the containers, the second input load indicating an amount of inputs received by the service when a response time of the service is reduced by increasing numbers of the containers to the second numbers of the containers in each of second points in time prior to the first point in time, and increasing the numbers of containers to the first numbers of the containers.

11 Claims, 20 Drawing Sheets

FIG. 11

<CONTAINER NUMBER INFORMATION>

| INPUT LOAD (RPS) | NUMBER OF CONTAINERS | | | |
|---|---|---|---|---|
| | LOGIC (IMAGE) 32a | LOGIC (TEXT) 32b | LOGIC (USER) 32c | LOGIC (ARTICLE) 32d |
| 100 | 1 | 2 | 1 | 2 |
| 200 | 1 | 3 | 2 | 3 |
| 500 | 1 | 5 | 3 | 5 |

NON-TRANSITORY COMPUTER-READABLE RECORDING MEDIUM, SERVICE MANAGEMENT DEVICE, AND SERVICE MANAGEMENT METHOD

CROSS-REFERENCE TO RELATED APPLICATION

This application is based upon and claims the benefit of priority of the prior Japanese Patent Application No. 2021-046825, filed on Mar. 22, 2021, the entire contents of which are incorporated herein by reference.

FIELD

A certain aspect of embodiments described herein relates to a non-transitory computer-readable recording medium, a service management device, and a service management method.

BACKGROUND

With the development of cloud computing technology, microservice architecture, which provides a single service by combining multiple programs, is becoming more and more popular. In the microservice architecture, when the load on the container executing a certain program becomes excessively high, the response time of the service may be delayed. In this case, the load on the container is reduced and the delay in the response time can be thereby reduced by increasing the number of containers executing the program. However, it may take some time for the delay to be reduced. Note that the technique related to the present disclosure is also disclosed in Japanese Laid-Open Patent Publication Nos. 2005-316795 and 2012-108682.

SUMMARY

According to an aspect of the embodiments, there is provided a non-transitory computer-readable recording medium storing a service management program that causes a computer to execute a process, the process including: acquiring a first input load indicating an amount of inputs received by a service at a first point in time, the service being implemented by containers, identifying first numbers of the containers corresponding to the first input load by referring to a storage unit that stores information where a second input load is associated with second numbers of the containers, the second input load indicating an amount of inputs received by the service when a response time of the service is reduced by increasing numbers of the containers to the second numbers of the containers in each of second points in time prior to the first point in time; and increasing the numbers of containers to the first numbers of the containers.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIG. 11 schematically illustrates container number information in accordance with the first embodiment.

DESCRIPTION OF EMBODIMENTS

Prior to the description of an embodiment, what the inventor studied will be described.

Figure 1:
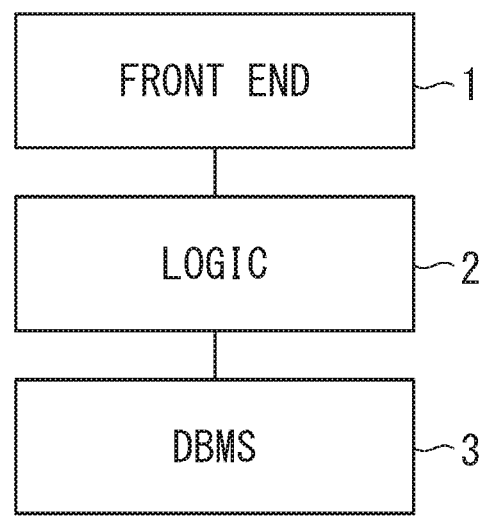
FIG. 1 is a schematic view of three-tiered architecture that implements a web service.

FIG. 1 is a schematic view of three-tiered architecture that implements a web service.

Here, the three-tiered architecture will be described using a social networking service (SNS) as an example of the web service. In the three-tiered architecture, the web service is implemented by three layers: a front end 1, a logic 2, and a database management system (DBMS) 3. The front end 1 is a program that receives various types of data from a user terminal. For example, when the user terminal posts an article to the SNS, the front end 1 receives user information, and text data and image data pertaining to the article.

The logic 2 is a program that performs various processes on the data received by the front end 1. As an example, the logic 2 performs user authentication based on the user information.

The DBMS 3 is a program that writes various data processed by the logic 2 to a storage device (not illustrated), and reads the data from the storage device.

Figure 2:
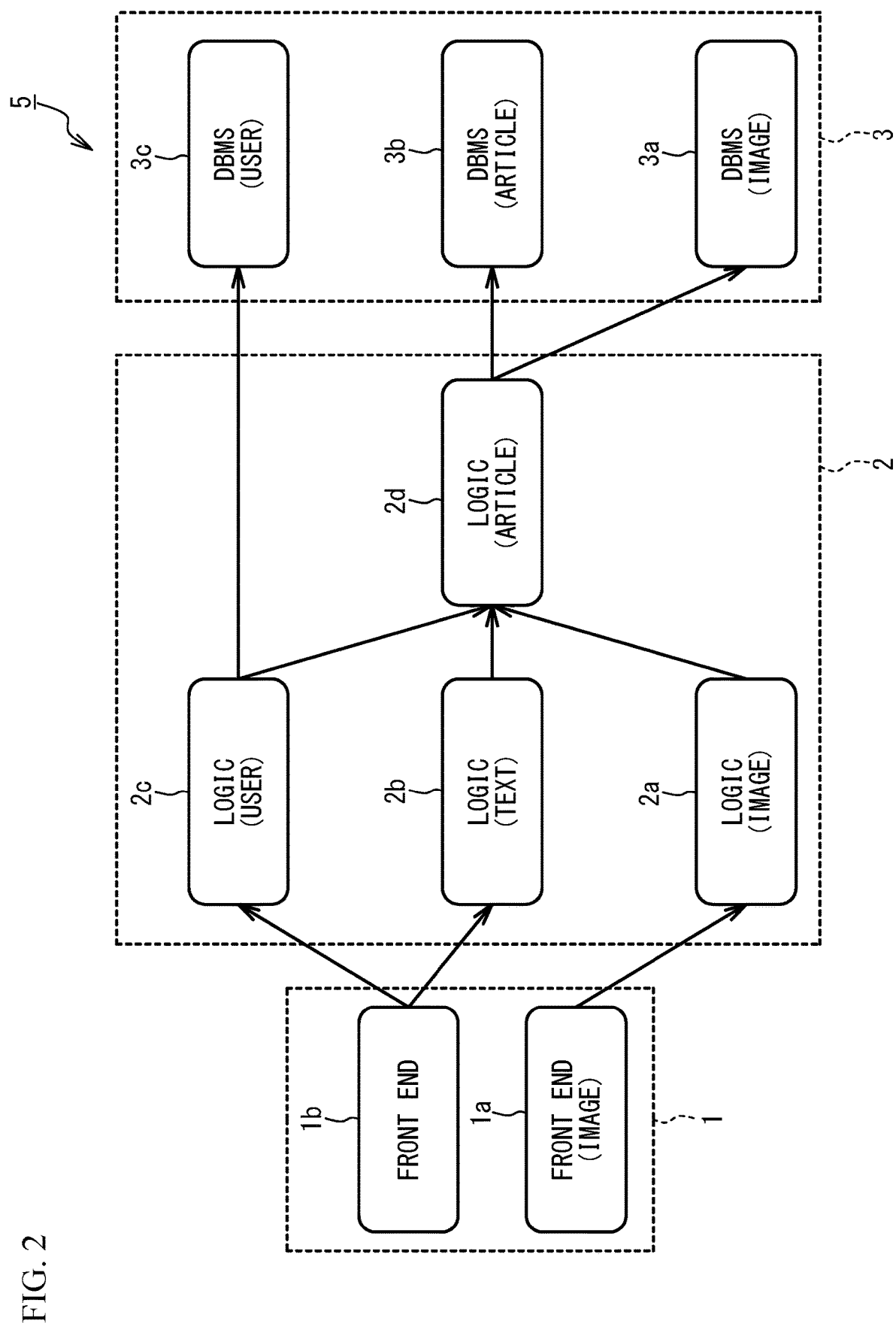
FIG. 2 is a schematic diagram of a system that provides a service equivalent to the web service illustrated in FIG. 1 with use of microservice architecture.

FIG. 2 is a schematic diagram of a system that provides a service equivalent to the web service illustrated in FIG. 1 with use of microservice architecture.

As illustrated in FIG. 2, in a service 5, the program is broken down by functions. For example, the front end 1 is broken down into a front end 1a that receives image data, and a front end 1b that receives data other than the image data.

The logic 2 is broken down into logics 2a to 2d for respective functions. The logic 2a is a program that performs a predetermined process on the image data received by the front end 1a. The logic 2b is a program that performs a predetermined process on the text data received by the front end 1b. The logic 2c is a program that performs user authentication based on the user information received by the front end 1b. The logic 2d is a program that generates an article that incorporates the text data and the image data when the user authentication succeeds.

Furthermore, the DBMS 3 is broken down into DBMSs 3a to 3c. The DBMS 3a is a program that stores the image data in the storage device, and the DBMS 3b is a program that stores the article in the storage device. The DBMS 3c is a program that stores the user information in the storage device.

The front ends 1a and 1b, the logics 2a to 2d, and the DBMSs 3a to 3c are executed in different containers.

The service such as an SNS requires fast response time. Thus, in the service 5, response time tends to be more important than throughput. The response time is the time from when the service 5 receives a request for processing from the user terminal until when the service 5 returns a notification indicating that the processing is completed to the user terminal. The response time is important also in systems for electronic commerce, Internet banking, and online gaming. Although the required response time depends on systems, a response time equal to or less than, for example, 10 ms to 100 ms may be required.

In the service 5, when the load becomes excessively high in one of containers executing the respective logics 2a to 2d, the container may become a bottleneck, resulting in long response time. In this case, it may be considered to improve the response time by increasing the number of the containers of which the load is excessively high.

Figure 3:
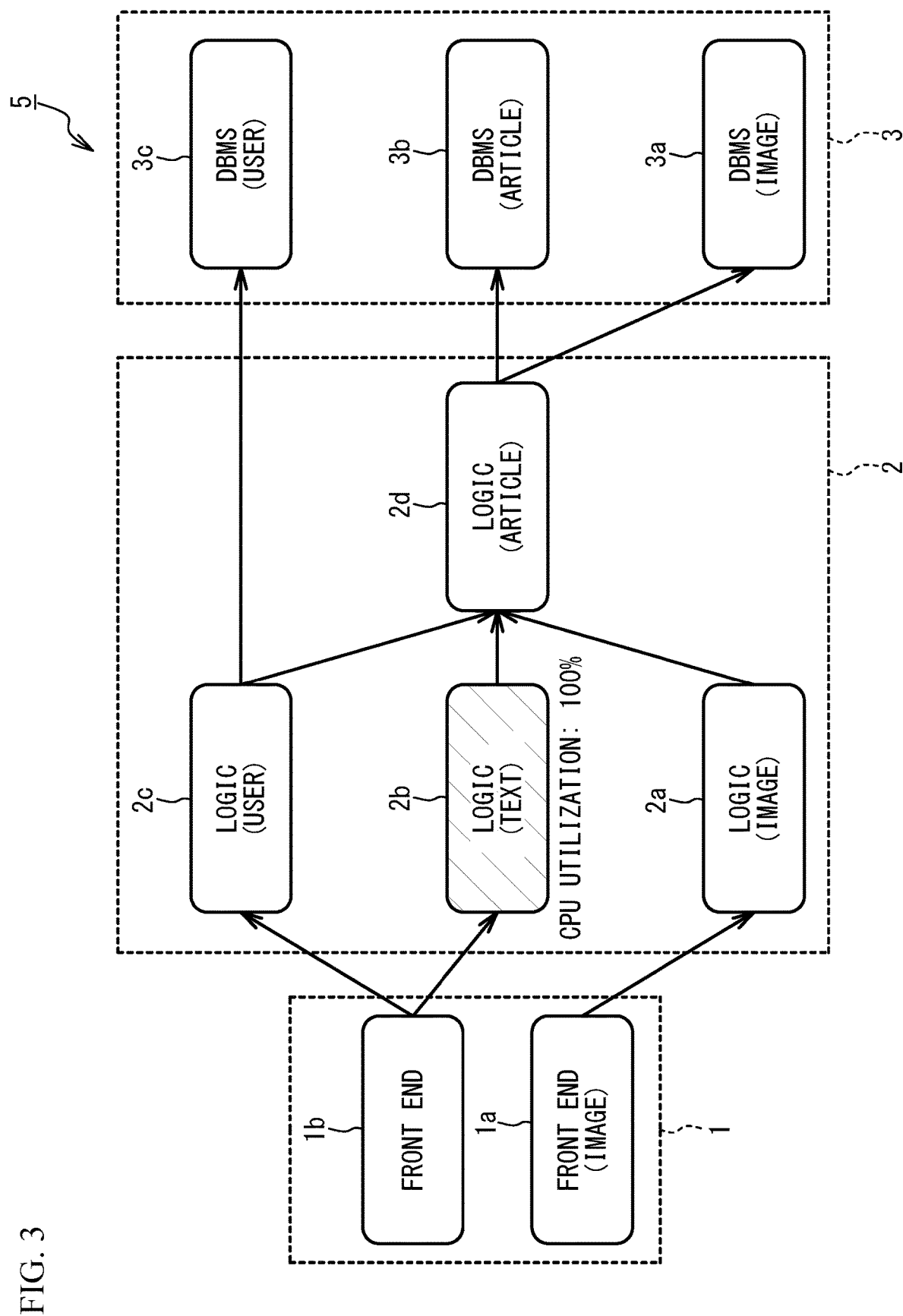
FIG. 3 is a diagram (No. 1) for describing automatic scaling in the microservice architecture.
Figure 4:
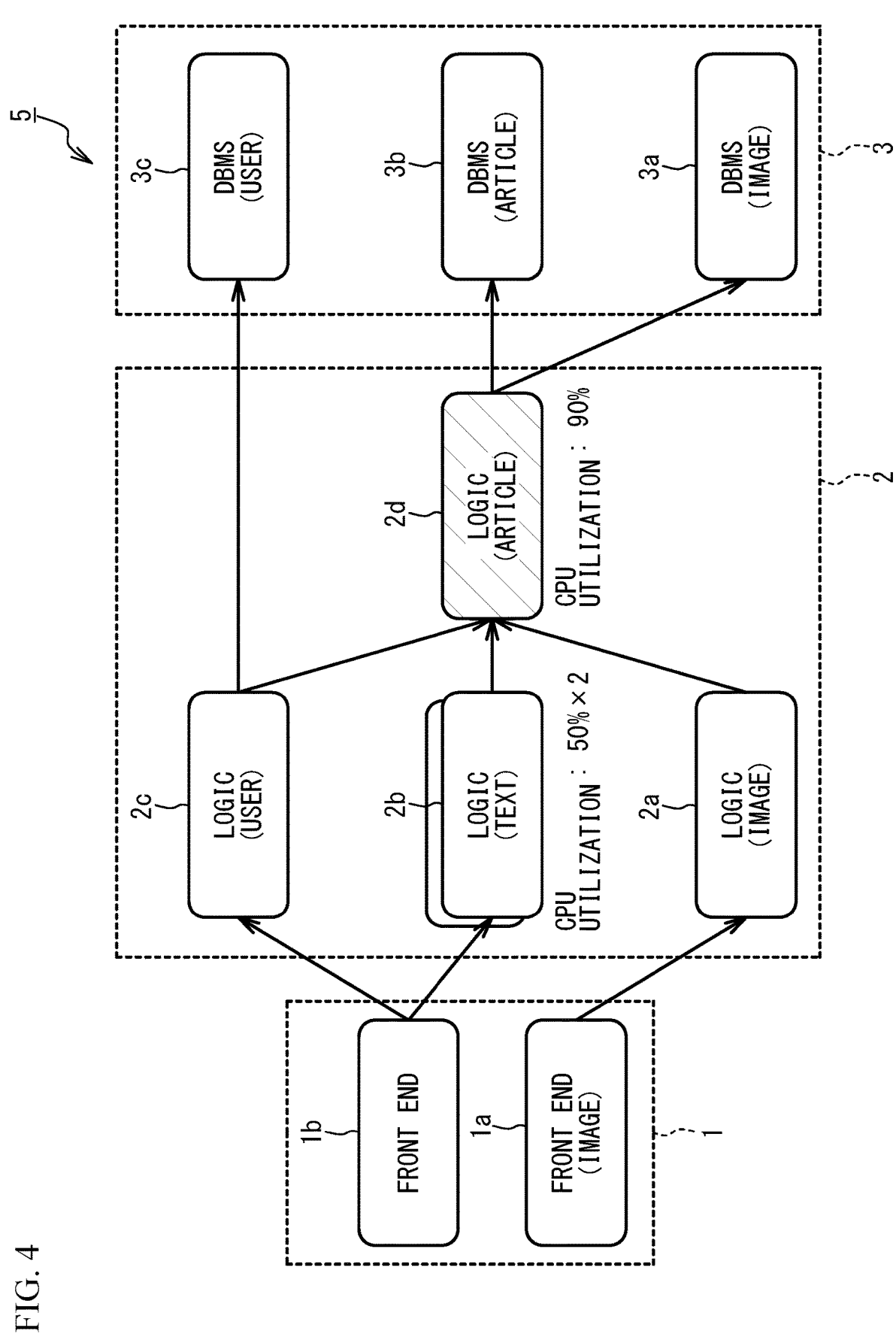
FIG. 4 is a diagram (No. 2) for describing the automatic scaling in the microservice architecture.
Figure 5:
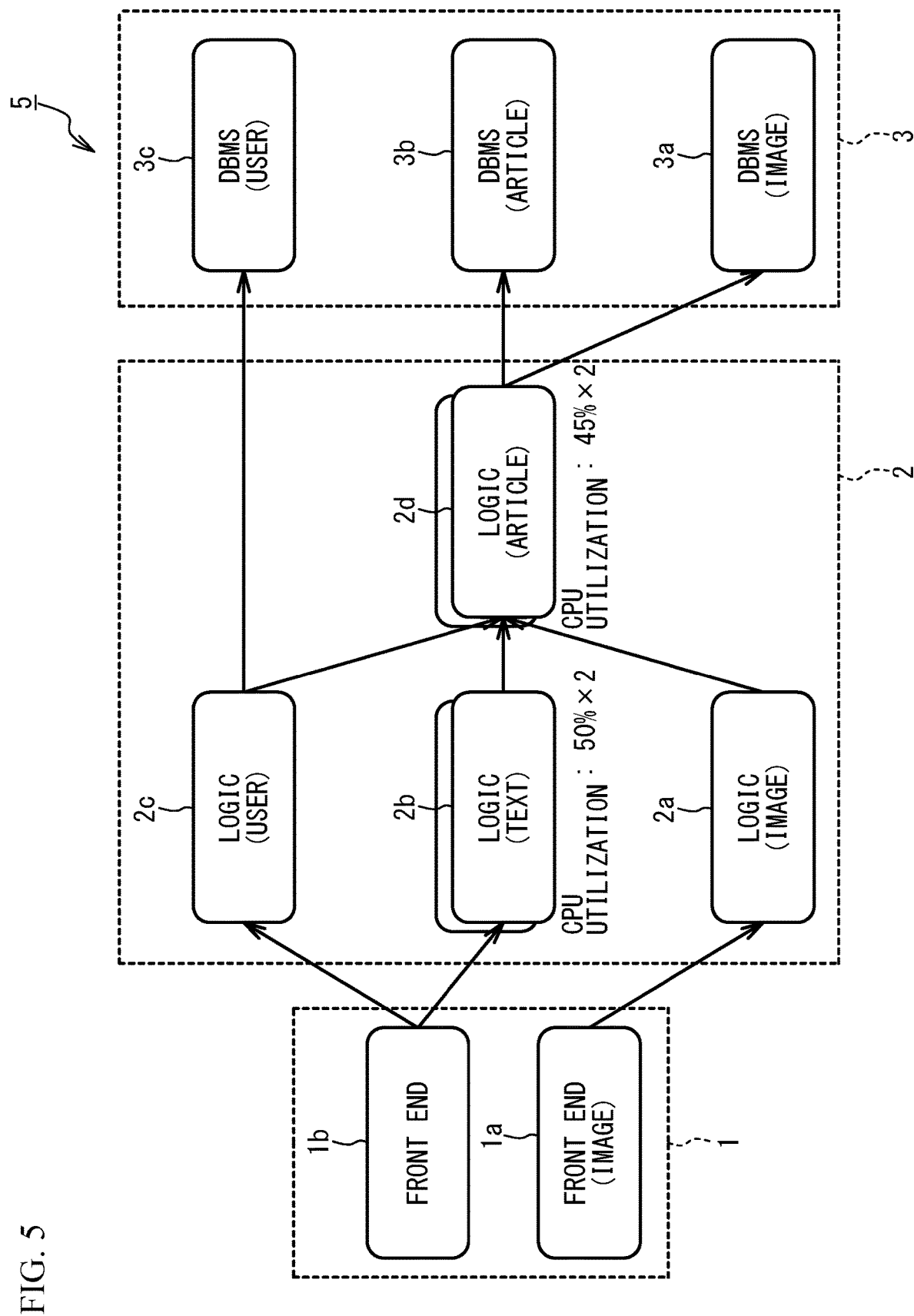
FIG. 5 is a diagram (No. 3) for describing the automatic scaling in the microservice architecture.

This will be described with reference to FIG. 3 to FIG. 5. FIG. 3 to FIG. 5 are diagrams for describing automatic scaling in the microservice architecture.

For example, discussed is a case where the CPU utilization becomes 100% in the container executing the logic 2b and the container becomes a bottleneck, causing delay in the response time as illustrated in FIG. 3. In this case, as illustrated in FIG. 4, by increasing the number of the containers executing the logic 2b from, for example, one to two, the CPU utilization in each container becomes 50%, thereby reducing the load on the container. Increasing or decreasing the number of containers according to the load on the container as described above is referred to as automatic scaling.

Here, as the load on the container executing the logic 2b is reduced, the processing capacity of the container increases, which may result in increase in the load on the container executing the subsequent logic 2d. For example, in the example of FIG. 4, the CPU utilization is 90% in the container executing the logic 2d.

In this case, as illustrated in FIG. 5, by increasing the number of the containers executing the subsequent logic 2d from, for example, one to two, the load on the container executing the logic 2d is reduced. For example, in the example of FIG. 5, the CPU utilization of the container executing the logic 2d is reduced from 90% to 45%.

When the delay in the response time is eliminated (for example, the response time becomes equal to or less than a predetermined threshold value) by increasing the number of the containers executing the logic 2b and then, increasing the number of the containers executing the logic 2d, it can be said that the delay in the response time is eliminated by two rounds of the automatic scaling.

Generally, the number of logics that make up a service may be dozens, and two rounds of the automatic scaling are not enough in such a case. In addition, the automatic scaling itself requires time. Therefore, when the automatic scaling is performed sequentially as described above, it may take some time before the delay in the response time is reduced.

First Embodiment

Figure 6:
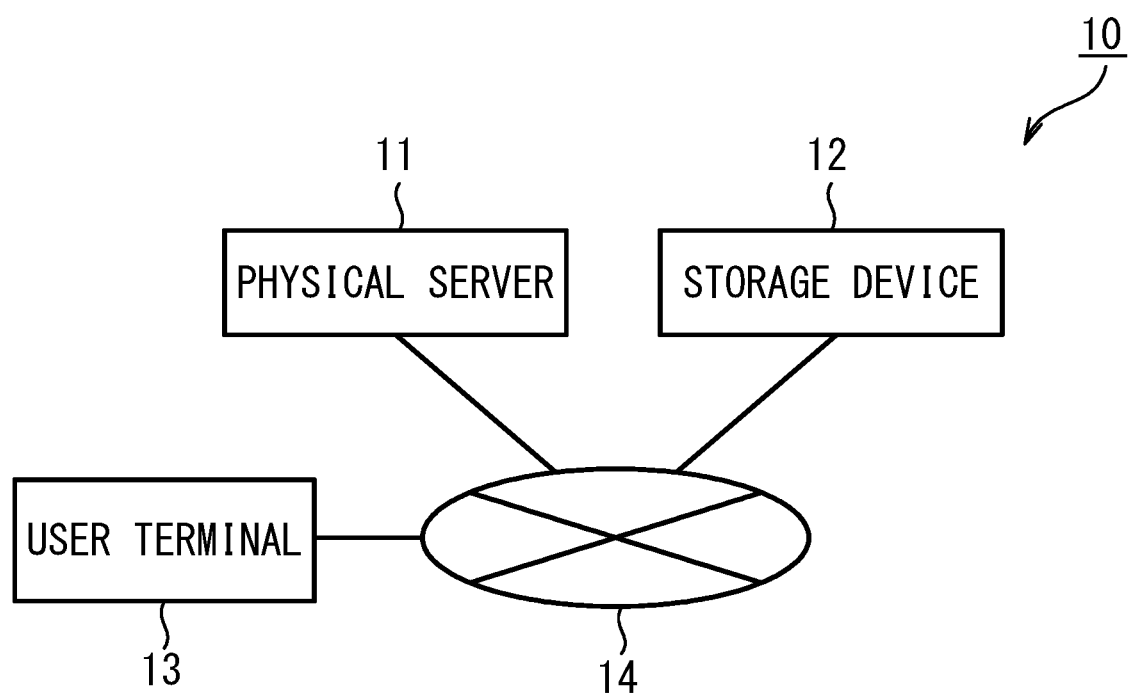
FIG. 6 is a block diagram of a system in accordance with a first embodiment.

FIG. 6 is a block diagram of a system in accordance with a first embodiment.

A system 10 is a system employing the microservice architecture, and provides a service for an SNS. The system 10 may provide any one of the following services: electronic commerce, Internet banking, and online gaming instead of the SNS.

As an example, the system 10 includes a physical server 11 and a storage device 12. The physical server 11 is a computing device that executes various programs for implementing the microservice architecture. The storage device 12 is hardware for implementing a database in the system 10.

The physical server 11 and the storage device 12 are interconnected through a network 14 such as a local area network (LAN) or the Internet. The storage that implements the database may be included in the physical server 11.

Users of the service can use the service such as an SNS provided by the system 10 by connecting their user terminals 13 such as smartphones to the network 14.

Figure 7:
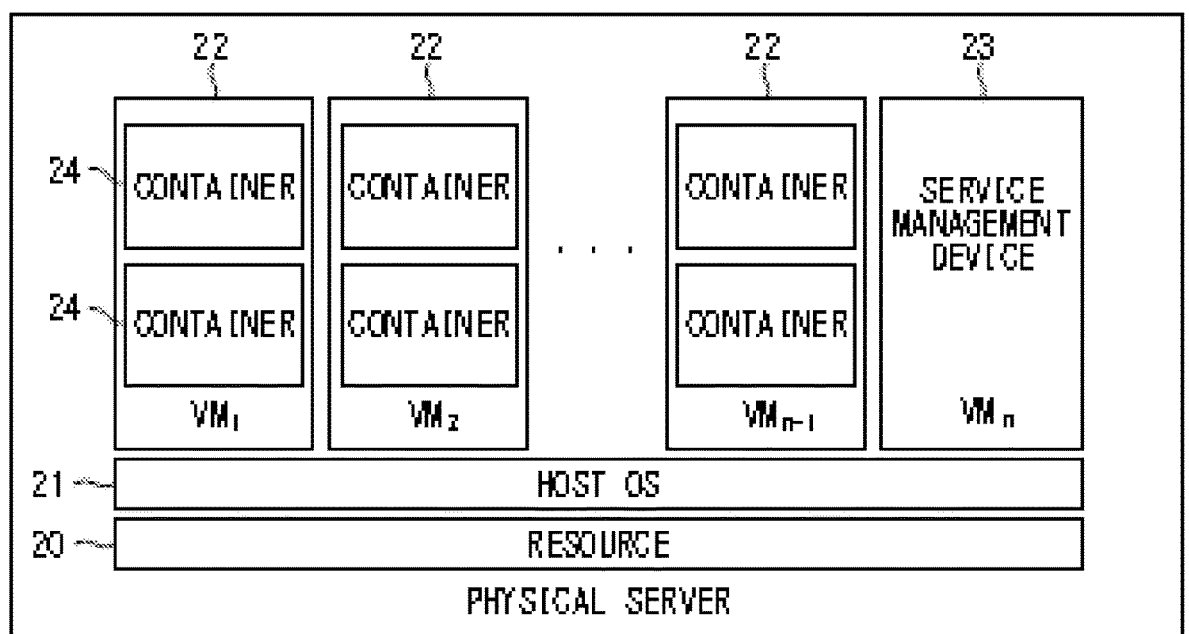
FIG. 7 is a schematic view of a physical server in accordance with the first embodiment.

FIG. 7 is a schematic view of the physical server 11.

As illustrated in FIG. 7, the physical server 11 includes a physical resource 20 such as a central processing unit (CPU) and a memory, and the resource 20 executes a host OS 21.

Furthermore, the physical server 11 boots virtual machines 22 on the host OS 21. Hereinafter, individual virtual machines 22 are identified using characters such as "VM$_1$", "VM$_2$", . . . , "VM$_n$". In addition, in the present embodiment, the virtual machine identified by "VM$_n$" is used as a service management device 23. The service management device 23 has a function that reduces the delay in the response time of the service provided by the system 10 as described later. Instead of implementing the service management device 23 with the virtual machine, a physical server different from the physical server 11 may be used as the service management device 23.

Each virtual machine 22 boots containers 24 using a part of the resource 20. DOCKER (registered trademark) is one of examples of the container engine used by each virtual machine 22 to boot the container 24. Each container executes a program for implementing the service provided by the system 10.

Figure 8:
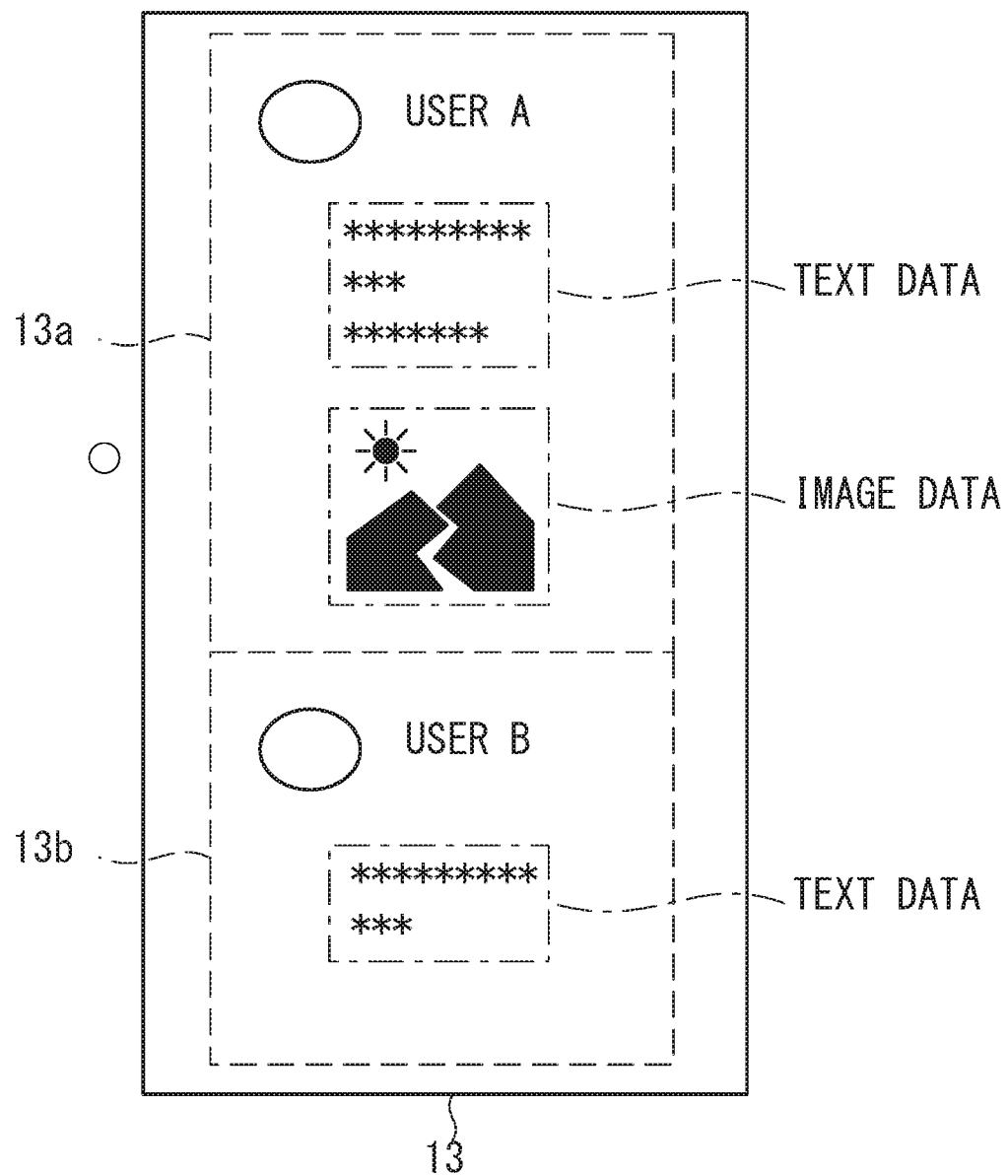
FIG. 8 schematically illustrates a screen display of a user terminal in accordance with the first embodiment.

FIG. 8 schematically illustrates a screen display of the user terminal 13.

In this example, a first article 13a and a second article 13b are displayed on the screen of the user terminal 13. The first article 13a is an article that the user A of the user terminal 13 is going to post, and includes text data and image data.

The second article 13b is an article posted by the user B different from the user A. In this example, the second article 13b is composed of only text data.

Figure 9:
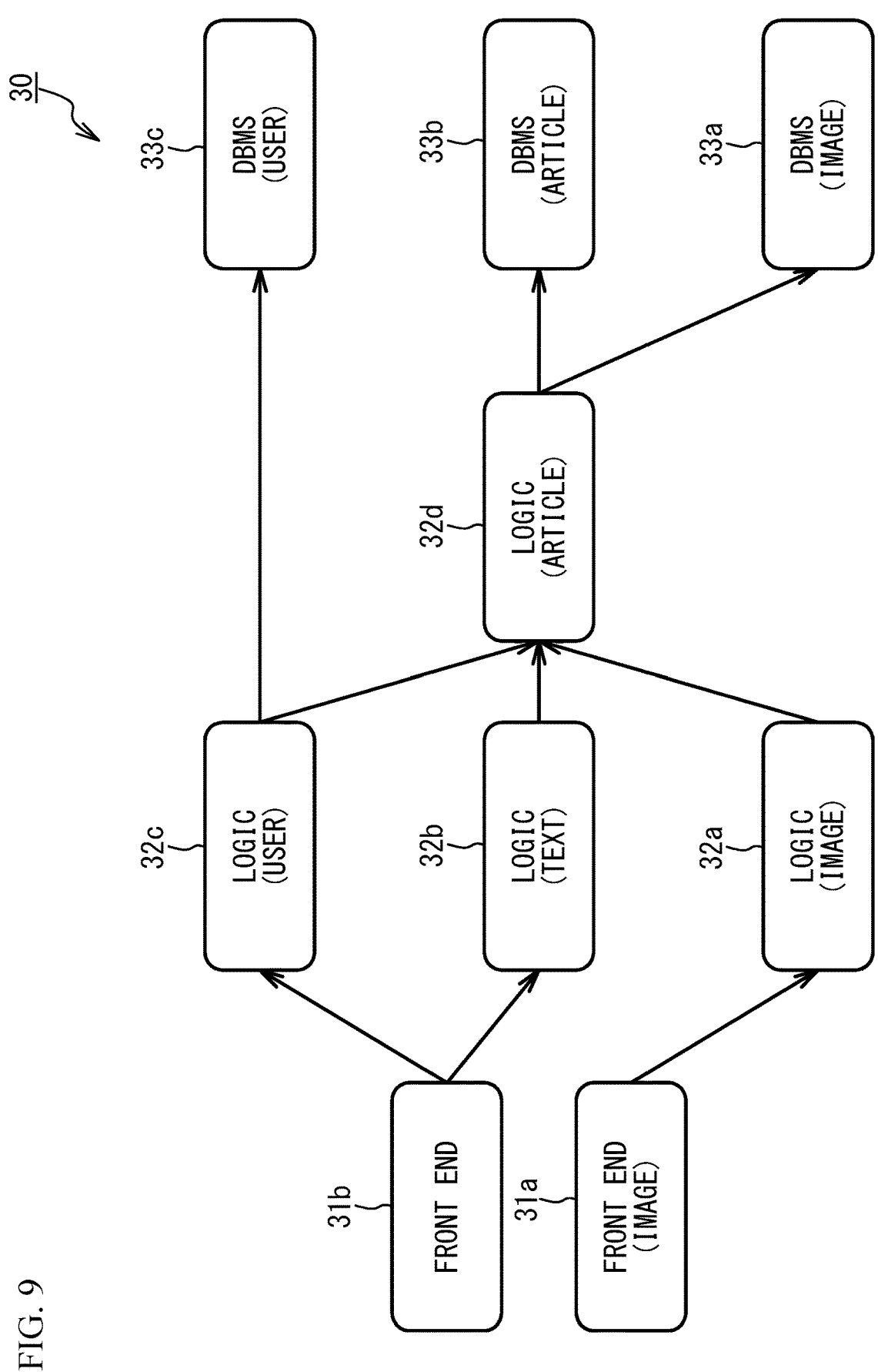
FIG. 9 schematically illustrates a service provided by the system in accordance with the first embodiment.

FIG. 9 is a schematic view of a service 30 provided by the system 10.

In this example, the service 30 is implemented by respective programs of front ends 31a and 31b, logics 32a to 32d, and DBMSs 33a to 33c. These programs are executed in different containers 24. For example, the front end 31a is executed by one of the containers 24 of the virtual machine 22 identified by "VM$_1$", and the front end 31b is executed by one of the containers 24 of the virtual machine 22 identified by "VM$_2$".

The front end 31a is a program that receives the image data included in the first article 13a (see FIG. 8) from the user terminal 13. The front end 31b is a program that receives the text data included in the first article 13a from the user terminal 13. The front end 31b also receives user information, which is a combination of a user name and a password, from the user terminal 13.

The user terminal 13 allocates data to the front end 31a or 31b as described above, depending on whether the type of data is image data or data other than image data.

The logic 32a is a program that performs a predetermined process on the image data received by the front end 31a. The logic 32b is a program that performs a predetermined process on the text data received by the front end 31b. The logic 32c is a program that performs user authentication based on the user information received by the front end 31b. The logic 32d is a program that generates the first article 13a (see FIG. 8) that incorporates the text data and the image data when the user authentication succeeds.

The DBMS 33a is a program that stores the image data in the storage device 12 (see FIG. 6). The DBMS 33b is a program that stores the first article 13a in the storage device 12. The DBMS 33c is a program that stores the user information in the storage device 12.

The arrows in FIG. 9 indicate paths connecting programs that are in caller-callee relationship, and indicate that the program at the origin of the arrow calls the program at the tip of the arrow. For example, the arrow between the front end 31a and the logic 32a indicates that the front end 31a calls the logic 32a.

Next, a description will be given of functional configurations of the service management device 23.

Figure 10:
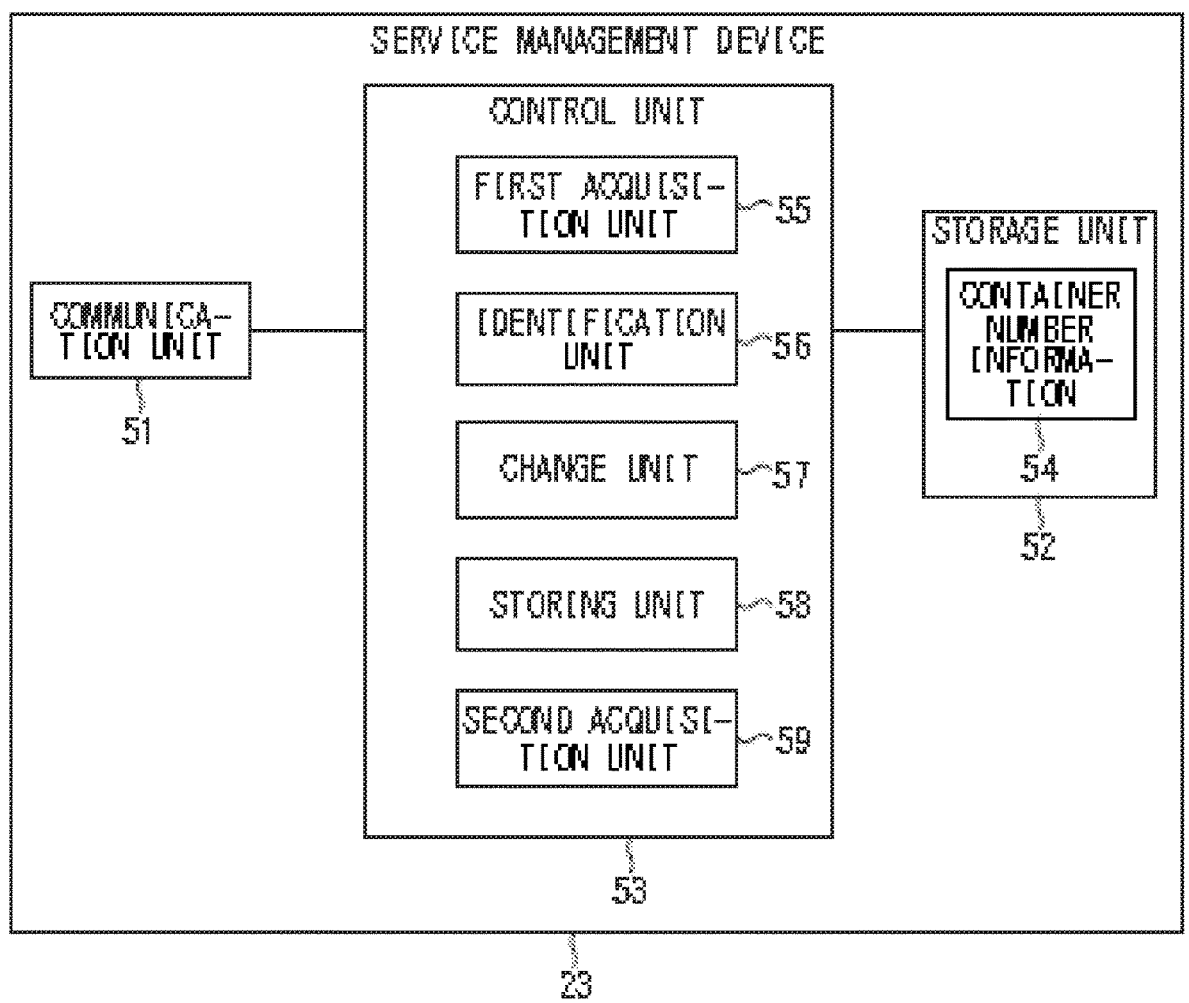
FIG. 10 is a functional block diagram of a service management device in accordance with the first embodiment.

FIG. 10 is a functional block diagram of the service management device 23.

As illustrated in FIG. 10, the service management device 23 includes a communication unit 51, a storage unit 52, and a control unit 53.

The communication unit 51 is an interface for connecting the service management device 23 to the network 14 (see FIG. 6). The storage unit 52 stores container number information 54.

FIG. 11 schematically illustrates the container number information 54.

As illustrated in FIG. 11, the container number information 54 is information where an input load is associated with the respective numbers of containers executing the respective logics 32a to 32d. The container number information 54 is an example of information where a second input load, which indicates an amount of inputs received by the service when the response time of the service is reduced by increasing the numbers of containers to second numbers of containers in each of second points in time prior to a first point in time, is associated with the second numbers of the containers. The input load stored in the container number information 54 is the amount of inputs received by the service 30 when the delay in the response time of the service 30 was eliminated by increasing the numbers of containers in the past. The respective numbers of containers executing the respective logics 32a to 32d stored in the container number information 54 are the numbers of containers when the delay in the response time of the service 30 was reduced by increasing the respective numbers of containers executing the respective logics 32a to 32d. In the following description, the amount of inputs received by the service 30 is referred to as the input load on the service 30. Examples of the input load on the service 30 include, but are not limited to, the number of requests per second (RPS: requests per second) and the data transfer amount of the whole request.

For example, a case where the delay in the response time of the service 30 was reduced by increasing the respective numbers of containers executing the respective logics 32a to 32d to one, two, one, and two, when the input load on the service 30 was 100 RPS is discussed. In this case, as illustrated in FIG. 11, the respective numbers of containers executing the respective logics 32a to 32d: 1, 2, 1, and 2 are associated with the input load 100 RPS and recorded. Additionally, a case where the delay in the response time of the service 30 was reduced by increasing the respective numbers of containers executing the respective logics 32a to 32d to one, five, three, and five when the input load on the service 30 was 500 RPS is discussed, for example. In this case, as illustrated in FIG. 11, the respective numbers of containers executing the respective logics 32a to 32d: 1, 5, 3, and 5 are associated with the input load 500 RPS and recorded.

In the present embodiment, the container number information 54 is recorded for the front end 31b that affects the delay in the response time of the service 30. That is, the input load in FIG. 11 indicates the input load on the front end 31b. The container number information 54 may be recorded for each of the front ends 31a and 31b.

Referring back to FIG. 10, a description will be continued.

The control unit 53 is a processing unit that controls each unit of the service management device 23. As an example, the control unit 53 includes a first acquisition unit 55, an identification unit 56, a change unit 57, a storing unit 58, and a second acquisition unit 59.

The first acquisition unit 55 acquires the response time of the service 30. In the present embodiment, the first acquisition unit 55 acquires the response time of the front end 31b as the response time of the service 30. As an example, response time of the front end 31b is the time from when the front end 31b receives a process until when the front end 31b completes the process when the user terminal 13 posts an article to the service 30.

In addition, the first acquisition unit 55 acquires the current input load on the service 30. In the present embodiment, the first acquisition unit 55 acquires the input load on the front end 31b as the input load on the service 30. As an example, the first acquisition unit 55 acquires the number of requests per second to the front end 31b. The data transfer amount of the whole request may be acquired as the input load on the front end 31b, for example. The current input load on the service 30 is an example of a first input load indicating an amount of inputs received by the service at a first point in time.

The second acquisition unit 59 acquires the respective loads of the containers executing the respective logics 32a to 32d. As an example, the second acquisition unit 59 acquires the CPU utilization of each of the containers executing each of the logics 32a to 32d. The memory utilization or the data transfer amount may be acquired as the respective loads of the containers executing the respective logics 32a to 32d.

The identification unit 56 refers to the container number information 54 to identify the numbers of containers corresponding to the input load on the service 30 acquired by the first acquisition unit 55. As an example, the identification unit 56 refers to the container number information 54 to identify the numbers of containers associated with the input load equal to the input load on the service 30 acquired by the first acquisition unit 55.

For example, a case where the input load on the service 30 acquired by the first acquisition unit 55 is 200 RPS is discussed. In this case, the respective numbers of containers for the respective logics 32a to 32d (1, 3, 2, 3) corresponding to 200 RPS are identified from the container number information 54 illustrated in FIG. 11.

The change unit 57 increases or decreases the respective numbers of containers executing the respective logics 32a to 32d to the numbers of containers identified by the identification unit 56. The change unit 57 also performs the automatic scaling that increases or decreases the numbers of containers according to the respective loads of containers executing the respective logics 32a to 32d acquired by the second acquisition unit 59.

The storing unit 58 stores a record in the container number information 54 when the delay in the response time is reduced by increasing the number of containers. The record includes the input load on the service 30 when the response time was delayed, and the respective numbers of containers for the respective logics 32a to 32d when the delay in the response time was reduced.

Next, a description will be given of a service management method in accordance with the present embodiment.

Figure 12A:
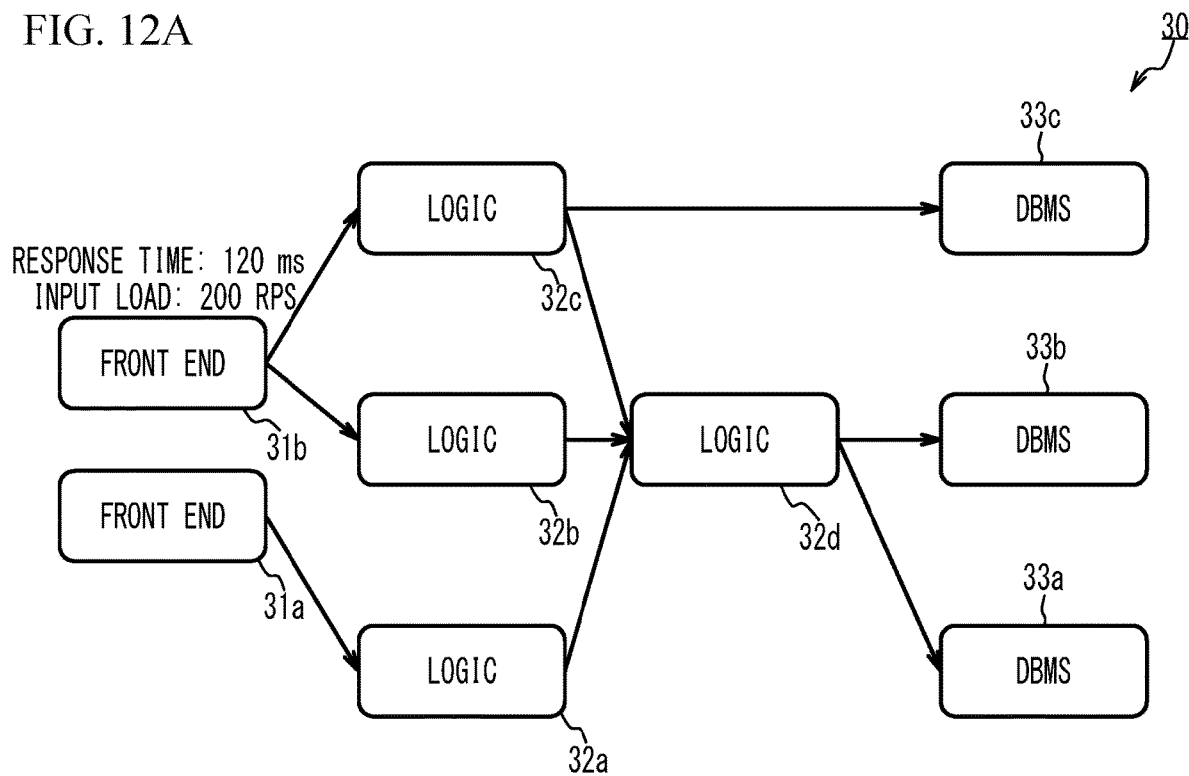
FIG. 12A and FIG. 12B are schematic views illustrating a service management method in accordance with the first embodiment.
Figure 12B:
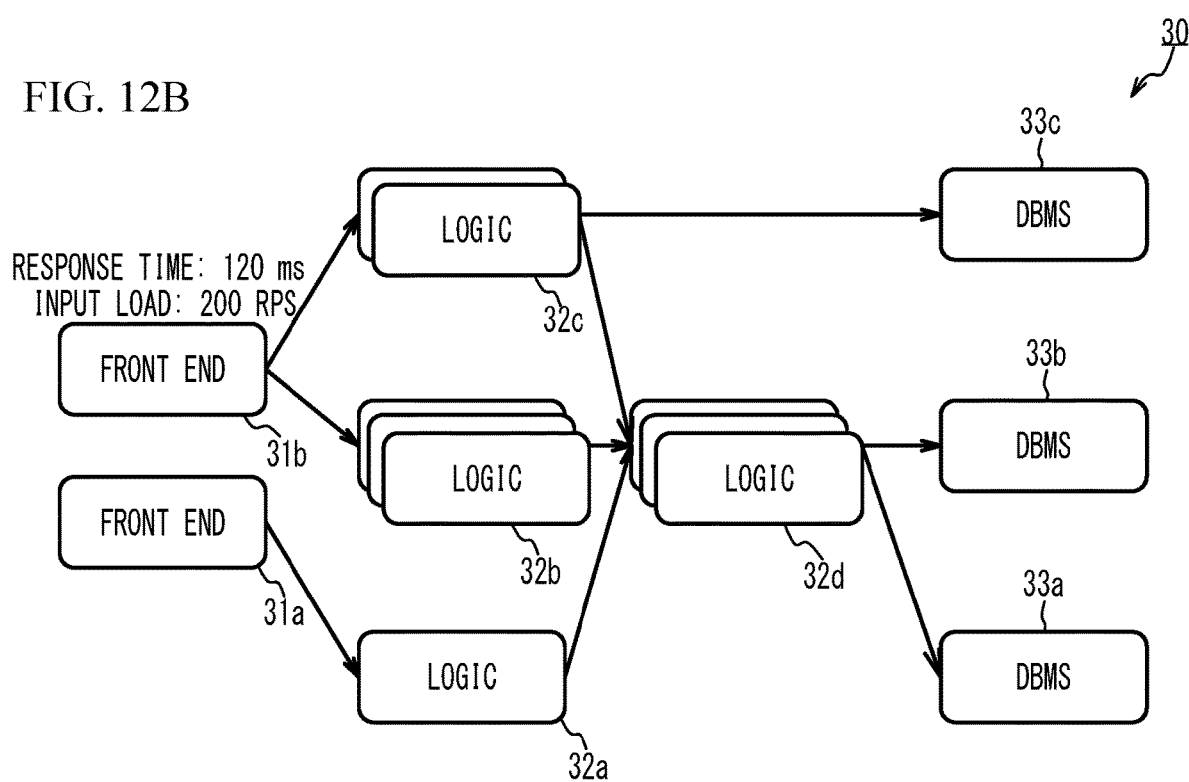

FIG. 12A and FIG. 12B are schematic views illustrating the service management method in accordance with the present embodiment.

First, as illustrated in FIG. 12A, the service management device 23 measures the response time of the front end 31b. Then, the service management device 23 determines whether the response time of the front end 31b is greater than a predetermined threshold value. Here, a case where the response time of the front end 31b is 120 ms, and the predetermined threshold value is 100 ms is discussed.

In this case, since the response time of the front end 31b (120 ms) is greater than the predetermined threshold value (100 ms), the service management device 23 acquires the input load on the front end 31b. The threshold value 100 ms is determined based on, for example, the response time required of the service 30.

Then, the service management device 23 refers to the container number information 54 (see FIG. 11) to identify the numbers of containers corresponding to the acquired input load. The numbers of containers corresponding to the acquired input load is an example of first numbers of the containers corresponding to the first input load. For example, a case where the input load on the front end 31b is 200 RPS as illustrated in FIG. 12A is discussed. In this case, in the container number information 54 illustrated in FIG. 11, the respective numbers of containers for the respective logics 32a to 32d of the record having 200 RPS in the item of the input load are identified as the numbers of containers corresponding to the acquired input load.

Then, the service management device 23 increases the respective numbers of containers executing the respective logics 32a to 32d to the identified numbers of containers at one time as illustrated in FIG. 12B. For example, in the container number information 54 illustrated in FIG. 11, the respective numbers of containers for the respective logics 32a to 32d corresponding to the input load 200 RPS are 1, 3, 2, and 3. Therefore, the service management device 23 increases the number of containers executing the logic 32b from one to three, increases the number of containers executing the logic 32c from one to two, and increases the number of containers executing the logic 32d from one to three.

The record stored in the container number information 54 indicates the respective numbers of containers for the respective logics 32a to 32d with which the delay was reduced when the response time of the service 30 was delayed in the past. In the present embodiment, the respective numbers of containers for the respective logics 32a to 32d are increased, at one time, to the numbers of containers with which the delay was reduced in the past. Therefore, compared with the conventional automatic scaling that increases the numbers of containers sequentially according to the loads of the containers, the time it takes for the delay in the response time of the service 30 to be reduced can be reduced.

Next, the service management method in accordance with the present embodiment will be described.

Figure 13:
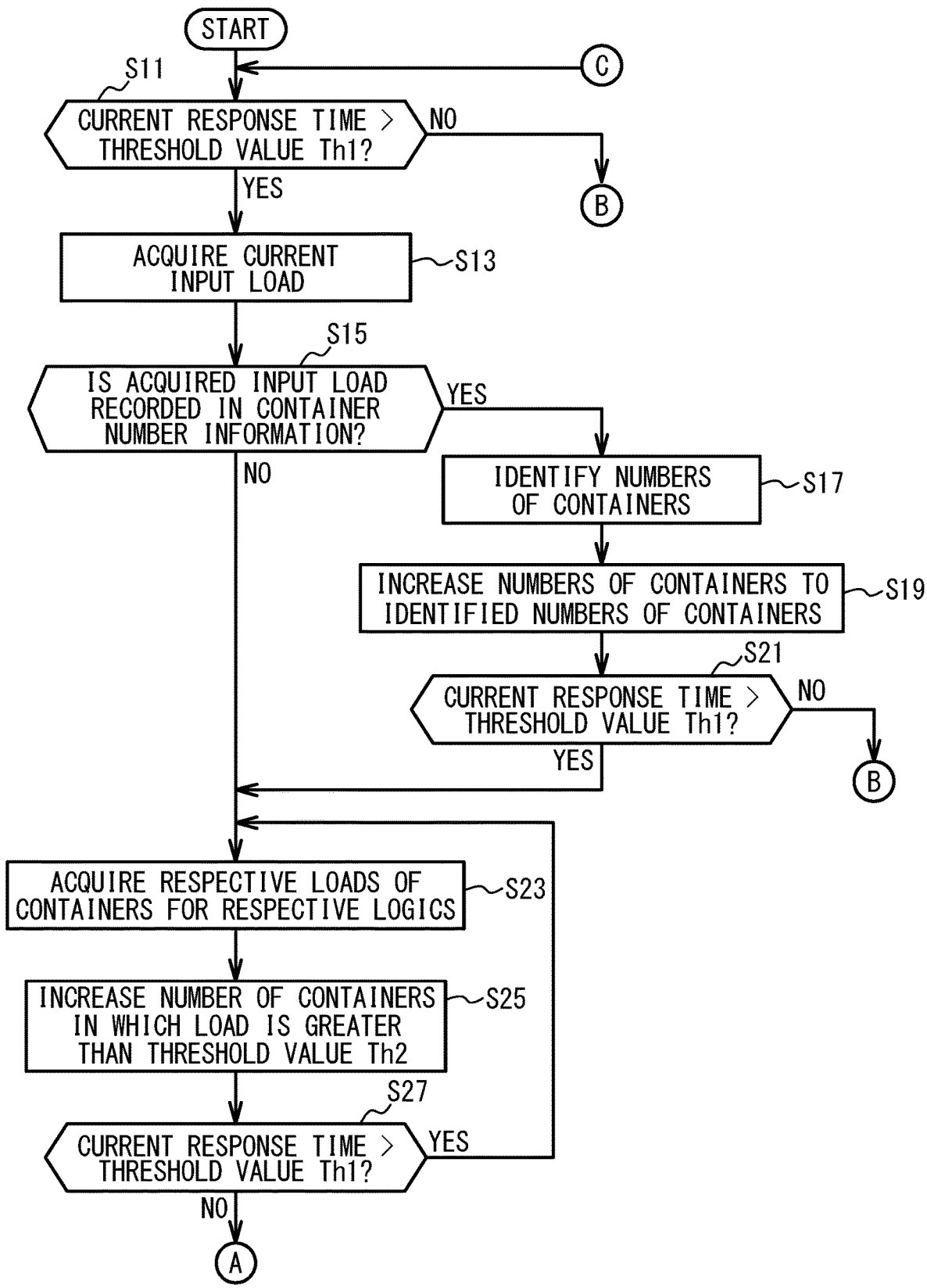
FIG. 13 is a flowchart (No. 1) of the service management method in accordance with the first embodiment.
Figure 14:
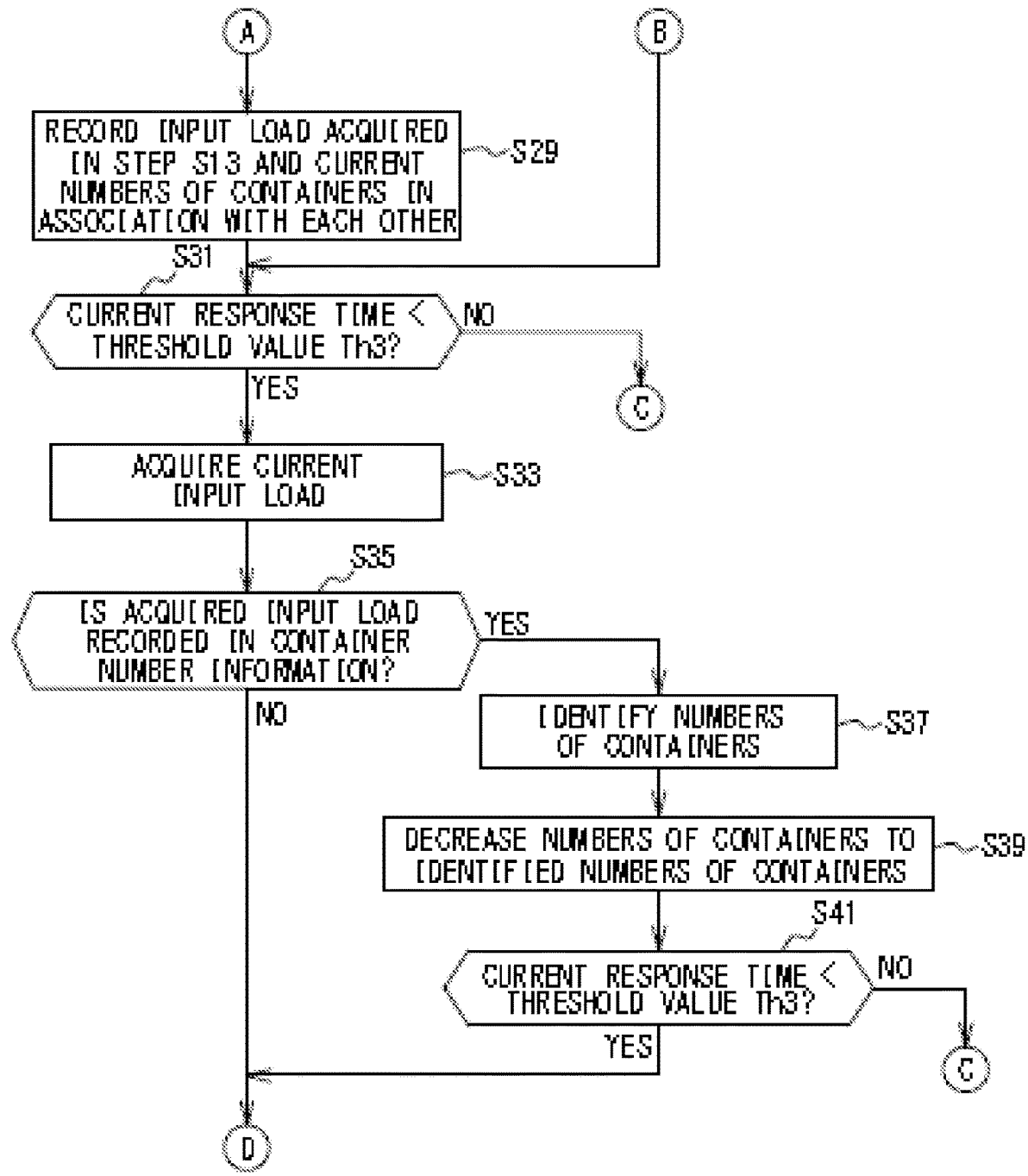
FIG. 14 is a flowchart (No. 2) of the service management method in accordance with the first embodiment.
Figure 15:
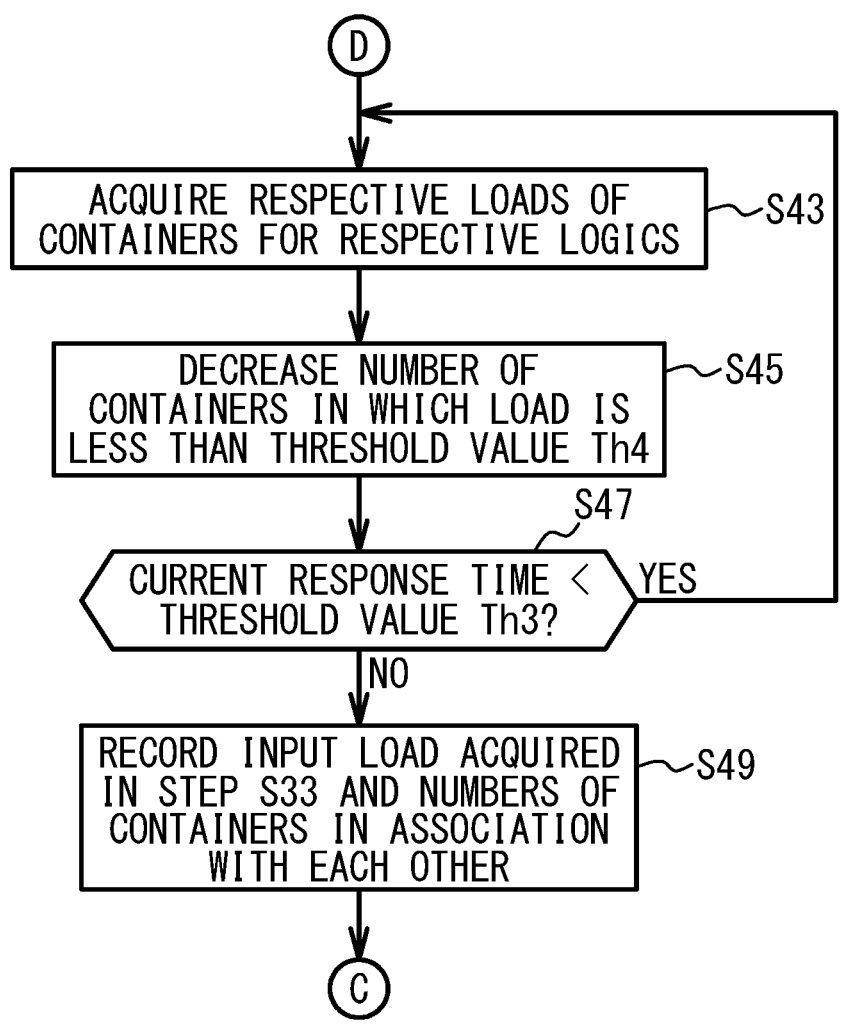
FIG. 15 is a flowchart (No. 3) of the service management method in accordance with the first embodiment.

FIG. 13 to FIG. 15 are flowcharts of the service management method in accordance with the present embodiment.

First, the identification unit 56 determines whether the current response time of the service 30 acquired by the first acquisition unit 55 is greater than a threshold value Th1 (step S11). The threshold value Th1 is determined based on, for example, the response time required of the service 30. For example, when a response time of 100 ms or less is required of the service 30, the threshold value Th1 can be set at 100 ms. The threshold value Th1 is an example of a first threshold value.

When the current response time of the service 30 is not greater than the threshold value Th1 (step S11/NO), the process proceeds to step S31 described later. On the other hand, when the current response time of the service 30 is greater than the threshold value Th1 (step S11/YES), the first acquisition unit 55 acquires the current input load on the service 30 (step S13).

Then, the identification unit 56 determines whether the input load equal to the acquired input load is recorded in the container number information 54 (step S15). For example, a case where the input load acquired by the first acquisition unit 55 is 200 RPS is discussed. Since the input load equal to the acquired input load (200 RPS) is recorded in the container number information 54 in FIG. 11, the determination in step S15 becomes Yes in this case.

Note that the determination in step S15 may be Yes when the input load acquired by the first acquisition unit 55 is included within a predetermined range (for example, ±5 RPS) centered on the input load recorded in the container number information 54, for example. For example, a case where the input load acquired by the first acquisition unit 55 is 204 RPS is discussed. Here, the input load equal to the acquired input load (204 RPS) is not recorded in the container number information 54 in FIG. 11. However, the input load (204 RPS) is included within a predetermined range (195 RPS to 205 RPS) centered on the input load (200 RPS) recorded in the container number information 54. The determination in step S15 may be Yes in this case.

When the input load equal to the acquired input load is recorded in the container number information 54 (step S15/YES), the identification unit 56 identifies the respective numbers of containers for the respective logics 32a to 32d corresponding to the input load equal to the acquired input load (step S17). The respective numbers of containers for the respective logics 32a to 32d corresponding to the input load equal to the acquired input load are examples of third numbers of the containers corresponding to a third input load, which is equal to the first input load.

Then, the change unit 57 increases the respective numbers of containers executing the respective logics 32a to 32d to the numbers of containers identified by the identification unit 56 (step S19).

Next, the change unit 57 determines whether the current response time of the service 30 acquired by the first acquisition unit 55 is greater than the threshold value Th1 (step S21). The process in step S21 is a process for determining whether the response time of the service 30 is reduced to the threshold value Th1 or less by increasing the numbers of containers in step S19. In other words, in step S21, it is determined whether the delay in the response time of the service 30 is eliminated by increasing the numbers of containers in step S19.

When the current response time is less than the threshold value Th1 (step S21/NO), this means that the response time of the service 30 is reduced to the threshold value Th1 or less. In this case, the process proceeds to step S31 described later. On the other hand, when the current response time is greater than the threshold value Th1 (step S21/YES), it is considered that the delay in the response time of the service 30 is not eliminated sufficiently. In this case, the process proceeds to step S23. When the input load equal to the input load acquired by the first acquisition unit 55 is not recorded in the container number information 54 (step S15/NO), the process also proceeds to step S23.

In step S23 to step S27, the same processes as those of the conventional automatic scaling are performed. First, the second acquisition unit 59 acquires the respective loads of containers executing the respective logics 32a to 32d (step S23). Then, the change unit 57 increases the number of containers in which the load is greater than a threshold value Th2 by a predetermined number (step S25). The threshold value Th2 is a threshold value used to determine whether the load on the container is excessively high. For example, when it is determined that the load on the container is excessively high when the CPU utilization of the container is greater than 80%, the CPU utilization 80% may be set as the threshold value Th2. The predetermined number by which the change unit 57 increases the number of containers may be, for example, one, or may be two or greater preliminarily determined with respect to each of the logics 32a to 32d.

Then, the change unit 57 determines whether the current response time acquired by the first acquisition unit 55 is greater than the threshold value Th1 (step S27). The process in step S27 is a process for determining whether the response time of the service 30 is reduced to the threshold value Th1 or less by increasing the number of containers in which the load is excessively high.

When the current response time is greater than the threshold value Th1 (step S27/YES), the processes from step S23 are executed again. When the current response time is less than the threshold value Th1 (step S27/NO), the storing unit 58 stores a new record in the container number information 54. More specifically, the input load acquired in step S13 and the respective current numbers of containers for the respective logics 32a to 32d (the numbers of containers after increase) are stored in the container number information 54 in association with each other (step S29).

Then, the identification unit 56 determines whether the current response time of the service 30 is less than a threshold value Th3 (step S31). The threshold value Th3 is less than the threshold value Th1 (Th3<Th1). The threshold value Th3 is a threshold value used to determine whether the current numbers of containers are greater than the numbers of containers actually required, and is determined based on the response time required of the service 30. For example, when the response time required of the service 30 is 100 ms or less, the threshold value Th3 may be set at, for example, 30 ms. When the response time required of the service 30 is 100 ms or less, the fact that the current response time of the service 30 is less than 30 ms or less is considered to mean that the load on each container is low. In this case, even when the numbers of containers are reduced, the response time required of the service 30 is likely to be achieved. Thus, to effectively use the resource 20, it is desirable to reduce the numbers of containers. The processes in and after step S31 are processes for reducing the numbers of containers when the current numbers of containers is greater than the numbers of containers actually required. The threshold value Th3 is an example of a second threshold value.

When the current response time is equal to or greater than the threshold value Th3 (step S31/NO), the current numbers of containers is considered to be appropriate. In this case, the processes from step S11 are executed again. On the other hand, when the current response time is less than the threshold value Th3 (step S31/YES), the current numbers of containers are considered to be excessive. In this case, the first acquisition unit 55 acquires the current input load on the service 30 (step S33).

Then, the identification unit 56 determines whether the input load equal to the acquired input load is recorded in the container number information 54 as in step S15 (step S35). When the input load equal to the acquired input load is recorded in the container number information 54 (step S35/YES), the identification unit 56 identifies the numbers of containers corresponding to the acquired input load (step S37).

Then, the change unit 57 decreases the respective numbers of containers executing the respective logics 32a to 32d to the numbers of containers identified in the step S37 (step S39).

Then, the change unit 57 determines whether the current response time of the service 30 is less than the threshold value Th3 (step S41). The process in step S41 is a process for determining whether the response time of the service 30 becomes equal to or greater than the threshold value Th3 as a result of decreasing the numbers of containers in step S39. In other words, in step S41, it is determined whether the state where the numbers of containers are excessive is resolved as a result of decreasing the numbers of containers in step S39.

When the current response time is equal to or greater than the threshold value Th3 (step S41/NO), it is considered that the state where the numbers of containers are excessive is resolved. In this case, the processes from step S11 are executed again. On the other hand, when the current response time is less than the threshold value Th3 (step S41/YES), the process proceeds to step S43. When the input load equal to the acquired input load is not recorded in the container number information 54 (step S35/NO), the process also proceeds to step S43.

In steps S43 to S47, the same processes as those of the conventional automatic scaling are performed. First, the first acquisition unit 55 acquires the respective loads of the containers executing the respective logics 32a to 32d (step S43).

Then, the change unit 57 decreases the number of the containers in which the load is less than a threshold value Th4 (step S45). The threshold value Th4 is less than the threshold value Th2 (Th4<Th2). The threshold value Th4 is a threshold value used to determine whether the load on the container is excessively low. For example, when it is determined that the load on the container is excessively low when the CPU utilization of the container is less than 20%, the CPU utilization 20% may be set as the threshold value Th4.

Then, the change unit 57 determines whether the current response time of the service 30 is less than the threshold value Th3 (step S47).

When the current response time of the service 30 is less than the threshold value Th3 (step S47/YES), the processes from step S43 are executed again. On the other hand, when the current response time is equal to or greater than the threshold value Th3 (step S47/NO), the storing unit 58 stores a new record in the container number information 54 (step S49). More specifically, the input load acquired in step S33 and the respective current numbers of containers for the respective logics 32a to 32d are stored in the container number information 54 in association with each other. Thereafter, the process returns to step S11. The processes in FIG. 13 to FIG. 15 are repeated while the service 30 is being provided.

In the first embodiment described above, when the response time of the service 30 is greater than the threshold value Th1, the identification unit 56 identifies the respective numbers of containers executing the respective logics 32a to 32d corresponding to the current input load on the service 30 in step S17. More specifically, the identification unit 56 refers to the container number information 54 to identify the respective numbers of containers for the respective logics 32a to 32d corresponding to the input load equal to the current input load on the service 30. Then, in step S19, the change unit 57 increases the respective numbers of containers executing the respective logics 32a to 32d to the numbers of containers that have been identified. The record stored in the container number information 54 indicates the respective numbers of containers for the respective logics 32a to 32d with which the delay was reduced when the response time of the service 30 was delayed in the past. Therefore, compared with the conventional automatic scaling that increases the number of containers sequentially according to the load of the container executing each of the logics 32a to 32d, the time it takes for the delay in the response time of the service 30 to be reduced can be reduced.

In addition, when the response time of the service 30 is less than the threshold value Th3, which is less than the threshold value Th1, the identification unit 56 identifies the respective numbers of containers for the respective logics 32a to 32d corresponding to the current input load on the service 30 in step S37. More specifically, the identification unit 56 refers to the container number information 54 to identify the respective numbers of containers for the respective logics 32a to 32d corresponding to the input load equal to the current input load on the service 30. Then, in step S39, the change unit 57 decreases the respective numbers of containers executing the respective logics 32a to 32d to the numbers that have been identified. Accordingly, when the numbers of containers are considered to be excessive, the numbers of containers can be reduced to effectively use the resource 20.

In step S29, the storing unit 58 records the input load acquired in step S13 and the numbers of containers that have been increased in the container number information 54 in association with each other. This increases the number of records stored in the container number information 54, and therefore increases the possibility that the input load equal to the input load on the service 30 acquired by the first acquisition unit 55 is recorded in the container number information 54. Therefore, the possibility that the determination in step S35 in FIG. 14 becomes No and the conventional automatic scaling is thereby performed is reduced. This reduces the time it takes for the delay in the response time to be eliminated.

Second Embodiment

In the first embodiment, in step S15 of FIG. 13 and in step S35 of FIG. 14, it is determined whether the input load equal to the acquired input load is recorded in the container number information 54. In a second embodiment, the identification unit 56 identifies, from the container number information 54, the numbers of containers associated with the input load closest to the acquired input load.

Figure 16:
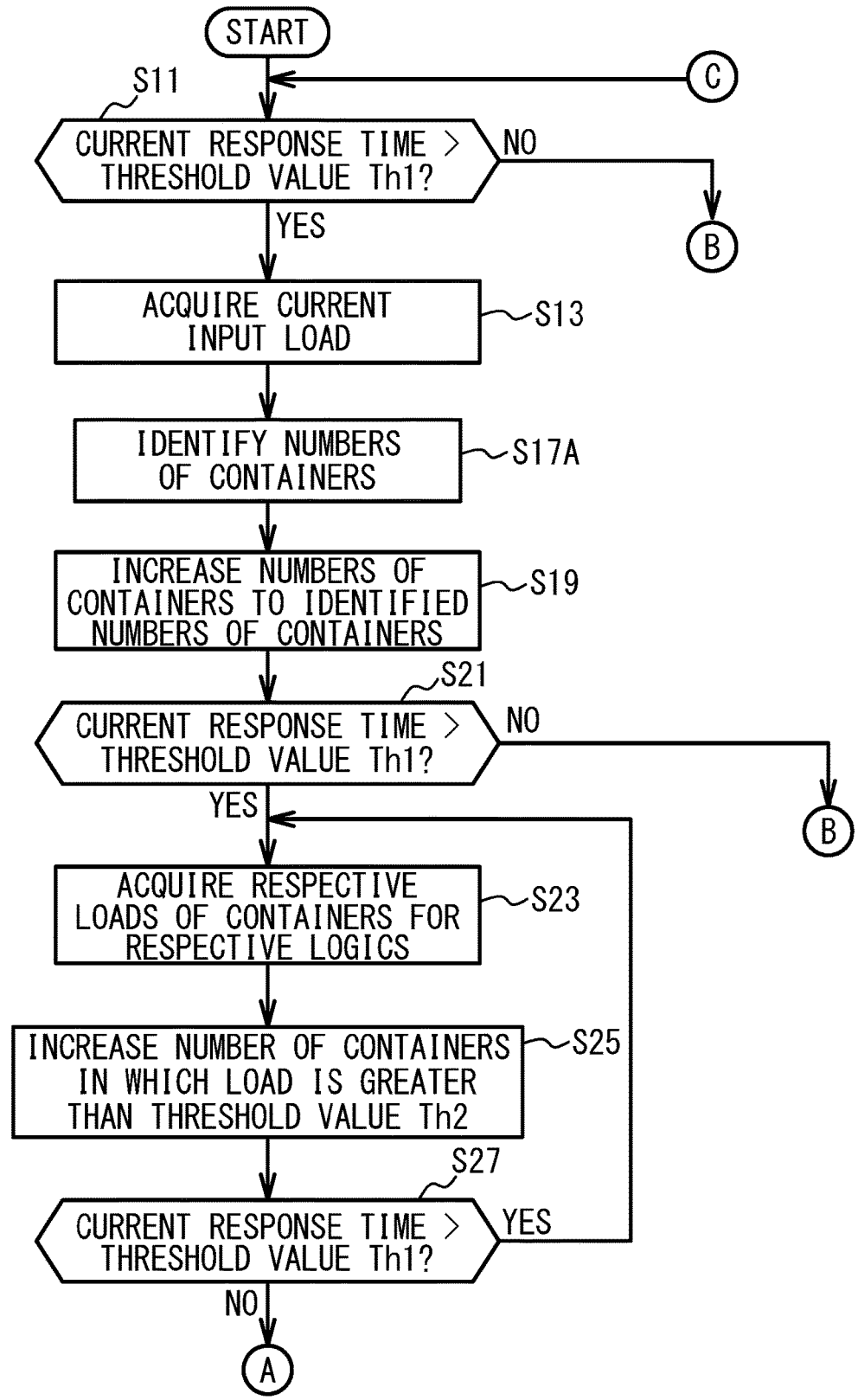
FIG. 16 is a flowchart (No. 1) of a service management method in accordance with a second embodiment.
Figure 17:
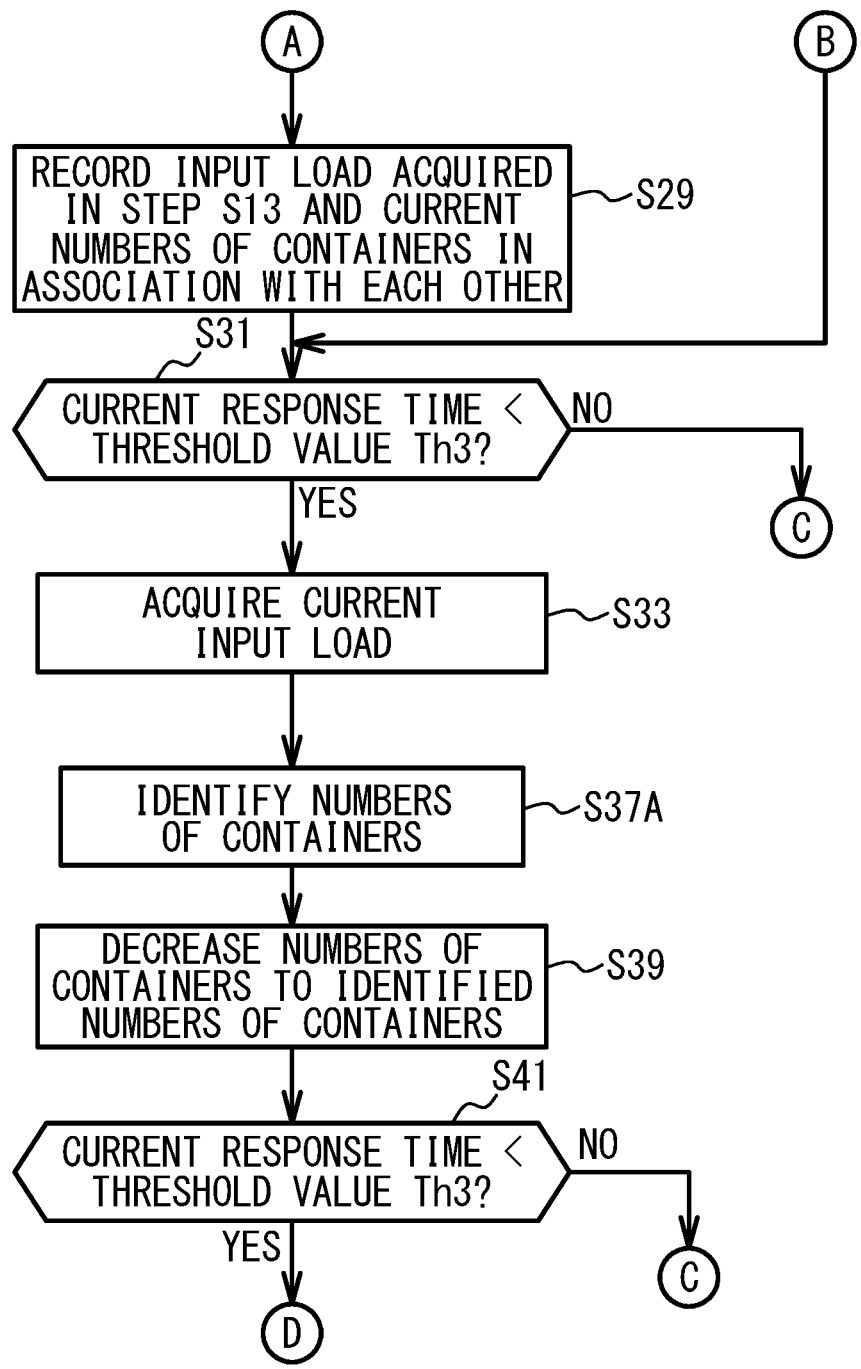
FIG. 17 is a flowchart (No. 2) of the service management method in accordance with the second embodiment.
Figure 18:
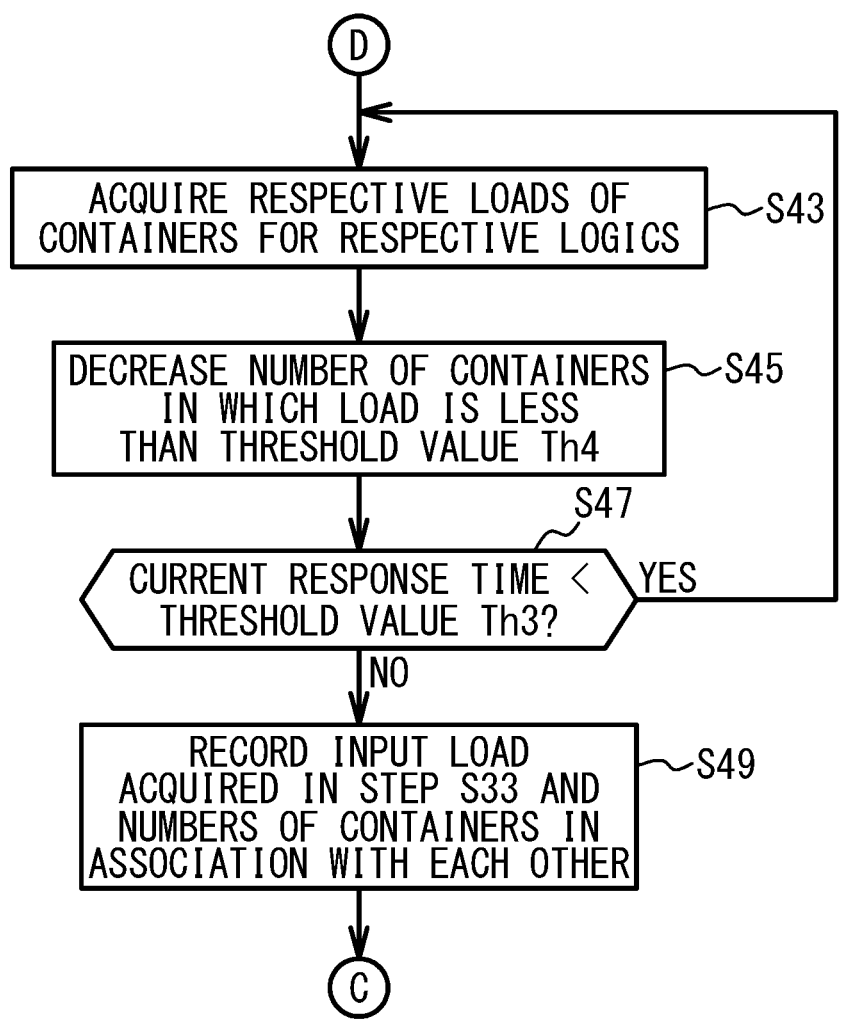
FIG. 18 is a flowchart (No. 3) of the service management method in accordance with the first embodiment.

FIG. 16 to FIG. 18 are flowcharts of a service management method in accordance with the second embodiment. In FIG. 16 to FIG. 18, the same processes as those in FIG. 13 to FIG. 15 are provided with the same reference numerals, and the detailed description thereof is omitted.

In the second embodiment, the method of identifying the numbers of containers executed by the identification unit 56 when the current response time of the service 30 is greater than the threshold value Th1 (step S11/YES) is different from that of the first embodiment. More specifically, the identification unit 56 identifies the numbers of containers corresponding to the input load closest to the current input load of the service 30 acquired by the first acquisition unit 55 in step S13 from the container number information 54 (step S17A). The numbers of containers corresponding to the input load closest to the current input load of the service 30 acquired by the first acquisition unit 55 in step S13 are examples of third numbers of the containers corresponding to a third input load, which is closest to the first input load. For example, a case where the current input load of the service 30 acquired in step S13 is 300 RPS is discussed. In this case, the identification unit 56 identifies the numbers of containers corresponding to the input load (200 RPS) closest to the current input load (300 RPS), in the container number information 54 illustrated in FIG. 11.

In the second embodiment, the method of identifying the number of containers executed by the identification unit 56 when the current response time of the service 30 is equal to or greater than the threshold value Th3 (step S31/YES) is different from that of the first embodiment. More specifically, the identification unit 56 identifies the numbers of containers corresponding to the input load closest to the current input load on the service 30 acquired by the first acquisition unit 55 in step S33 (step S37A).

Other processes are the same as those of the first embodiment.

In the second embodiment, the identification unit 56 identifies the numbers of containers corresponding to the input load closest to the current input load on the service 30, from the container number information 54. There may be a case where the input load equal to the current input load on the service 30 is not stored in the container number information 54. In the second embodiment, even in this case, the respective numbers of containers executing the respective logics 32a to 32d can be increased to the numbers of containers corresponding to the input load closest to the current input load. After increasing the numbers of containers, it is determined whether the conventional automatic scaling is necessary. Thus, the possibility that the automatic scaling is performed is reduced, and the time it takes for the delay in the response time to be reduced is reduced.

Hardware Configuration

Figure 19:
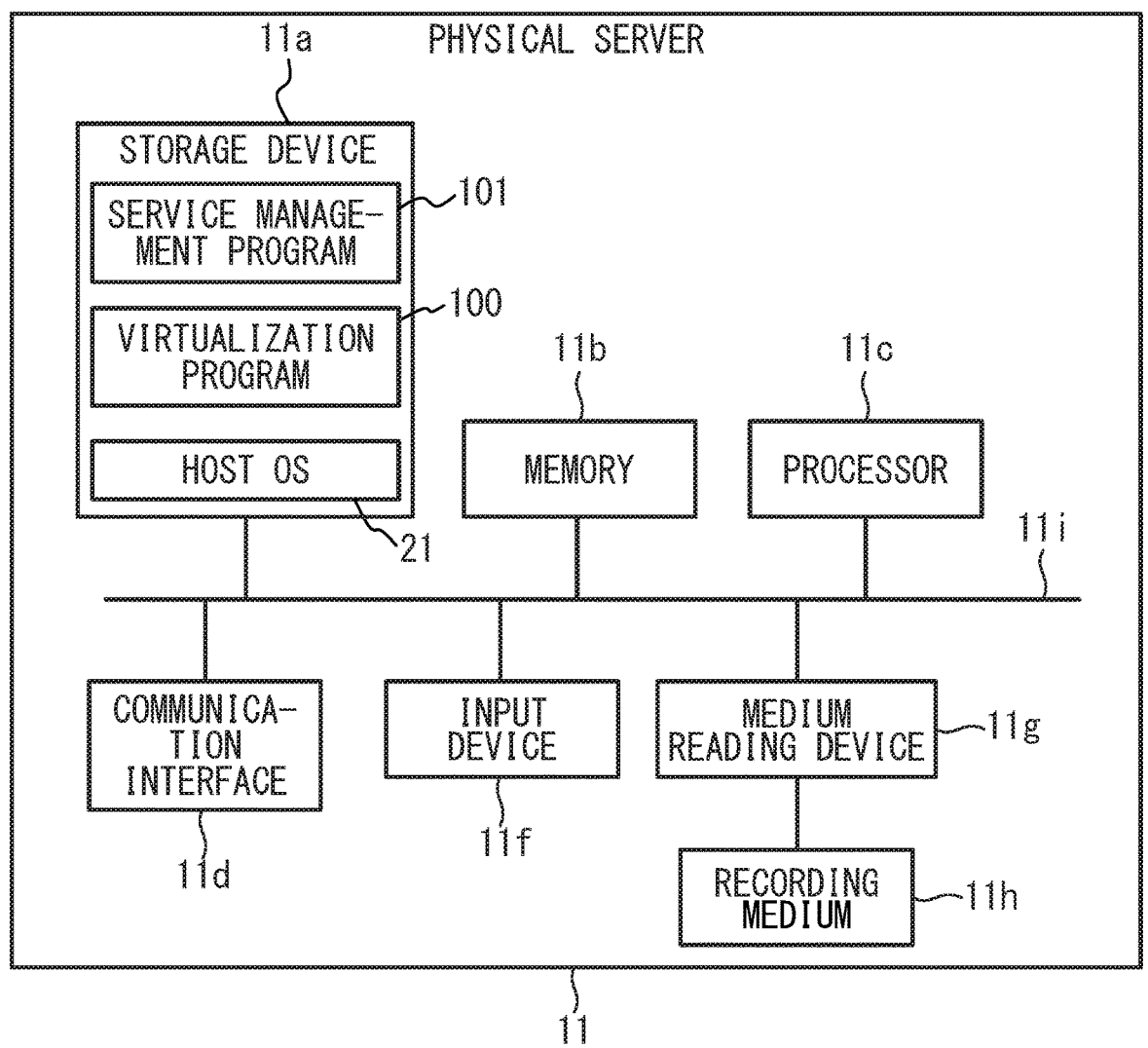
FIG. 19 is a hardware configuration diagram of the physical server in accordance with the first embodiment.

FIG. 19 is a hardware configuration diagram of the physical server 11.

As illustrated in FIG. 19, the physical server 11 includes a storage device 11a, a memory 11b, a processor 11c, a communication interface 11d, an input device 11f, and a medium reading device 11g. These components are connected to each other through a bus 11i.

The storage device 11a is a non-volatile storage such as a hard disk drive (HDD) or a solid state drive (SSD), and stores the host OS 21, a virtualization program 100, and a service management program 101. Each virtual machine 22 (see FIG. 7) is implemented by the memory 11b and the processor 11c cooperatively executing the virtualization program 100.

The service management program 101 is a program that causes the virtual machine identified by "$VM_n$" in FIG. 7 to function as the service management device 23.

Alternatively, the service management program 101 may be recorded in a computer-readable recording medium 11h, and the processor 11c may be made to read the service management program 101 from the computer-readable recording medium 11h through the medium reading device 11g.

Such a recording medium 11h may be a physically portable recording medium such as a compact disc read only memory (CD-ROM), a digital versatile disc (DVD), or a universal serial bus (USB) memory, for example. Also, a semiconductor memory such as a flash memory, or a hard disk drive may be used as the recording medium 11h. Such a recording medium 11h is not a temporary medium such as carrier waves not having a physical form.

Further, the service management program 101 may be stored in a device connected to a public line, the Internet, a LAN, or the like. In this case, the processor 11c allocated to the virtual machine identified by "$VM_n$" in FIG. 7 reads and executes the service management program 101.

Meanwhile, the memory 11b is hardware that temporarily stores data like a dynamic random access memory (DRAM) or the like. The service management program 101 is loaded into the memory 11b allocated to the virtual machine identified by "$VM_n$" in FIG. 7.

The processor 11c is hardware such as a central processing unit (CPU) or a graphical processing unit (GPU) that controls the respective components of the physical server 11. The processor 11c and the memory 11b both allocated to the virtual machine identified by "$VM_n$" in FIG. 7 cooperatively execute the service management program 101.

As the memory 11b and the processor 11c cooperate to execute the service management program 101, the control unit 53 of the service management device 23 (see FIG. 10) is implemented. The control unit 53 includes the first acquisition unit 55, the identification unit 56, the change unit 57, the storing unit 58, and the second acquisition unit 59.

The storage unit 52 (see FIG. 10) is implemented by the storage device 11a and the memory 11b both allocated to the virtual machine identified by "$VM_n$" in FIG. 7.

Furthermore, the communication interface 11d is hardware such as a network interface card (NIC) for connecting the physical server 11 to the network 14 (see FIG. 6). The communication unit 51 (see FIG. 10) is implemented by the communication interface 11d allocated to the virtual machine identified by "$VM_n$" in FIG. 7.

The input device 11f is hardware such as a keyboard and a mouse for allowing the administrator of the service 30 to input various types of data to the physical server 11.

The medium reading device 11g is hardware such as a CD drive, a DVD drive, and a USB interface for reading the recording medium 11h.

In the first and second embodiments described above, a program that implements part of functions that the control unit 53 of the service management device 23 has may be executed in the container 24 of the virtual machine different from the virtual machine identified by "$VM_n$".

Figure 20:
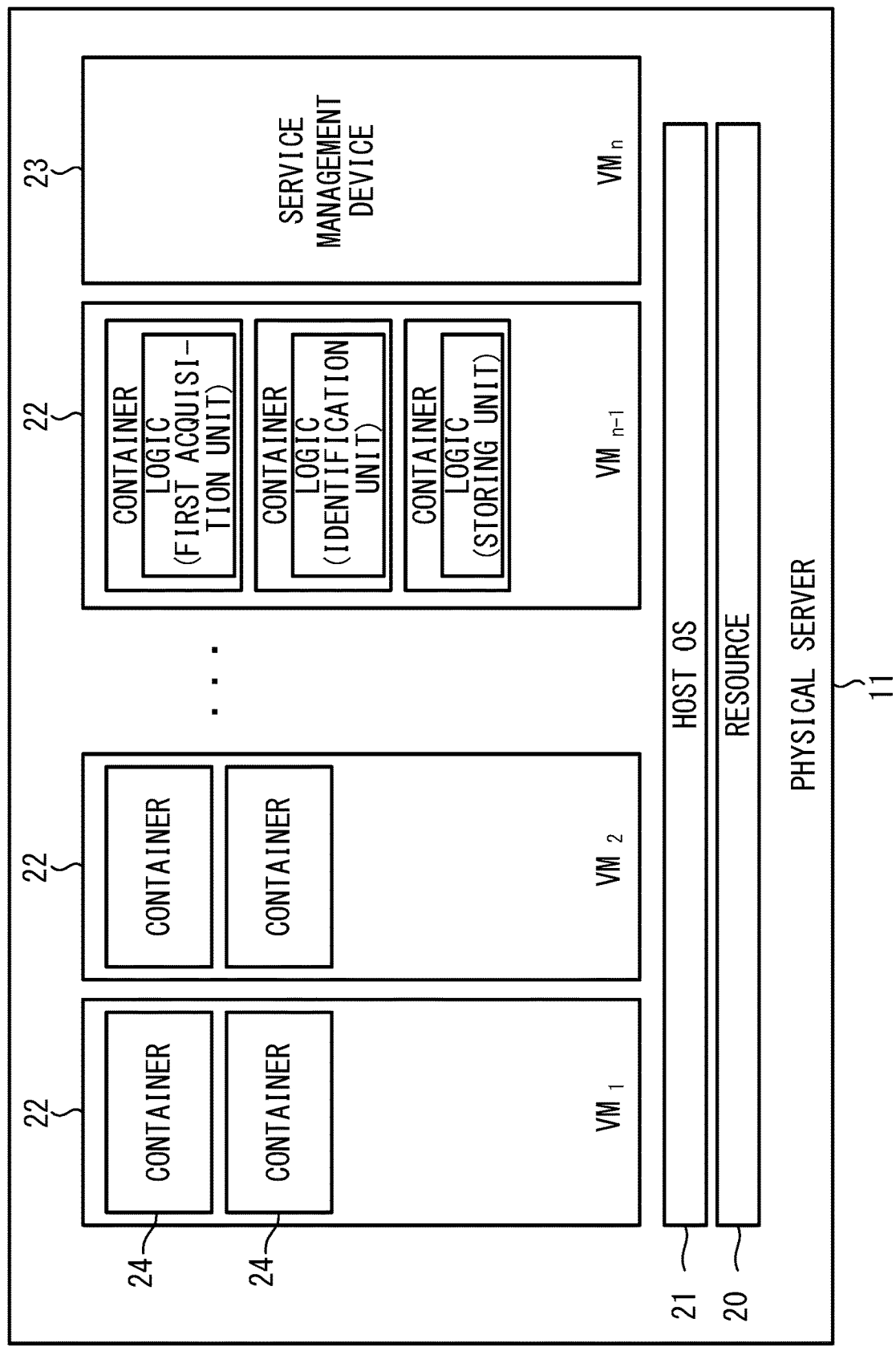
FIG. 20 is a schematic view of another example of the physical server.

FIG. 20 is a schematic view of another example of the physical server.

For example, in FIG. 20, the logics (programs) that implement the functions of the first acquisition unit 55, the identification unit 56, and the storing unit 58 are executed in the container 24 of the virtual machine identified by "$VM_{n-1}$". In this case, the control unit 53 of the service management device 23 includes the change unit 57 and the second acquisition unit 59.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various change, substitutions, and alterations could be made hereto without departing from the spirit and scope of the invention.

What is claimed is:

1. A non-transitory computer-readable recording medium storing a service management program that causes a computer including a plurality of containers to execute a process, the process comprising:

acquiring a first input load indicating an amount of inputs for a first service at a first point in time, the first service being implemented by first number of the containers included in the computer;

identifying a third number of the containers corresponding to the first input load by referring to a storage unit that stores first information where a second input load is associated with second number of the containers, the second input load indicating an amount of inputs for a second service when a response time of the second service is reduced by changing number of the containers to the second number of the containers at a second point in time prior to the first point in time;

changing the first number of the containers to the third number of the containers and acquiring a response time of the first service implemented by the third number of the containers;

when the response time of the first service implemented by the third number of the containers is larger than a first threshold value, changing the number of the containers from the third number to a fourth number, the fourth number being larger than the third number, and acquiring a response time of the first service implemented by the fourth number of the containers; and when the response time of the first service implemented by the fourth number of the containers is less than the first threshold value, updating the first information by adding information associated the first input load with the fourth number.

2. The non-transitory computer-readable recording medium according to claim 1, wherein the third number is the second number corresponding to the second input load which is equal to the first input load.

3. The non-transitory computer-readable recording medium according to claim 1, wherein the third number is second number corresponding to the second input load which is closest to the first input load.

4. The non-transitory computer-readable recording medium according to claim 1, the process further comprising:
   decreasing the numbers of the containers of the third number of the containers when the response time of the first service implemented by the third number of the containers is less than a second threshold value less than the first threshold value.

5. The non-transitory computer-readable recording medium according to claim 1, wherein the first service and the second service are a social networking service (SNS), electronic commerce, Internet banking, or online gaming.

6. A service management device comprising:
   a memory; and
   a plurality of containers; and
   a processor coupled to the memory and configured to:
      acquire a first input load indicating an amount of inputs for a first service at a first point in time, the first service being implemented by first number of the containers included in the device;
      identify a third number of the containers corresponding to the first input load by referring to a storage unit that stores first information where a second input load is associated with second number of the containers, the second input load indicating an amount of inputs for a second service when a response time of the second service is reduced by changing number of the containers to the second number of the containers at a second point in time prior to the first point in time;
      change the first number of the containers to the third number of the containers and acquire a response time of the first service implemented by the third number of the containers;
      when the response time of the first service implemented by the third number of the containers is lamer than a first threshold value, change the number of the containers from the third number to a fourth number, the fourth number being larger than the third number, and acquire a response time of the first service implemented by the fourth number of the containers; and
      when the response time of the first service implemented by the fourth number of the containers is less than the first threshold value, update the first information by adding information associated the first input load with the fourth number.

7. The service management device according to claim 6, wherein the third number is the second number corresponding to the second input load which is equal to the first input load.

8. The service management device according to claim 6, wherein the third number is the second number corresponding to the second input load which is closest to the first input load.

9. The service management device according to claim 6, wherein the processor is configured to
   decrease the numbers of the containers of the third number of the containers when the response time of the first service implemented by the third number of the containers is less than a second threshold value less than the first threshold value.

10. The service management device according to claim 6, wherein the first service and the second service are a social networking service (SNS), electronic commerce, Internet banking, or online gaming.

11. A service management method implemented by a computer, comprising:
   acquiring a first input load indicating an amount of inputs for a first service at a first point in time, the first service being implemented by first number of the containers included in the computer;
   identifying a third number of the containers corresponding to the first input load by referring to a storage unit that stores first information where a second input load is associated with second number of the containers, the second input load indicating an amount of inputs for a second service when a response time of the second service is reduced by changing number of the containers to the second number of the containers at a second point in time prior to the first point in time;
   changing the first number of the containers to the third number of the containers and acquiring a response time of the first service implemented by the third number of the containers;
   when the response time of the first service implemented by the third number of the containers is larger than a first threshold value, changing the number of the containers from the third number to a fourth number, the fourth number being larger than the third number, and acquiring a response time of the first service implemented by the fourth number of the containers; and
   when the response time of the first service implemented by the fourth number of the containers is less than the first threshold value, updating the first information by adding information associated the first input load with the fourth number.

* * * * *